United States Patent

Hirokane et al.

Patent Number: 5,863,649
Date of Patent: Jan. 26, 1999

[54] MAGNETO-OPTICAL RECORDING MEDIUM

[75] Inventors: Junji Hirokane, Nara; Hiroyuki Katayama, Sakura; Akira Takahashi, Nara; Kenji Ohta, Kitakatsuragi-gun, all of Japan

[73] Assignee: Sharp Kabushiki Kaisha, Osaka, Japan

[21] Appl. No.: 928,894

[22] Filed: Sep. 12, 1997

Related U.S. Application Data

[63] Continuation of Ser. No. 395,961, Feb. 28, 1995, abandoned.

[30] Foreign Application Priority Data

Mar. 1, 1994 [JP] Japan ................................. 6-031073

[51] Int. Cl.$^6$ .............................. G11B 5/66; G11B 11/00; B32B 15/01
[52] U.S. Cl. ...................... 428/332; 369/13; 428/694 RE; 428/694 MM; 428/694 EC; 428/694 SC
[58] Field of Search .............................. 369/13, 272, 283, 369/288; 428/694 ML, 694 MT, 694 RE, 684 MM, 694 EC, 332, 694 SC

[56] References Cited

U.S. PATENT DOCUMENTS

| | | | |
|---|---|---|---|
| 4,995,024 | 2/1991 | Arimune et al. | 369/13 |
| 5,208,799 | 5/1993 | Nakao et al. | 369/10 |
| 5,241,520 | 8/1993 | Ohta et al. | 369/13 |
| 5,278,810 | 1/1994 | Takahashi et al. | 369/13 |
| 5,379,275 | 1/1995 | Kaneko et al. | 369/13 |
| 5,420,833 | 5/1995 | Tanaka et al. | 369/13 |
| 5,428,585 | 6/1995 | Hirokane et al. | 369/13 |
| 5,428,586 | 6/1995 | Kobayashi et al. | 369/13 |
| 5,452,272 | 9/1995 | Murakami et al. | 369/13 |

FOREIGN PATENT DOCUMENTS

| | | |
|---|---|---|
| 258978A2 | 3/1988 | European Pat. Off. . |
| 586122A1 | 3/1994 | European Pat. Off. . |
| A-0498459 | 8/1992 | Germany . |
| A-0567335 | 10/1993 | Germany . |
| 81717 | 4/1993 | Japan . |
| 205336 | 8/1993 | Japan . |

OTHER PUBLICATIONS

German Patent Office, Office Action dated Oct. 23, 1995.
08/400,464, Hirokane et al., US Patent Application? (No Publication Date).

*Primary Examiner*—John J. Zimmerman
*Assistant Examiner*—Michael LaVilla
*Attorney, Agent, or Firm*—Dike, Bronstein, Roberts, & Cushman, LLP; David G. Conlin

[57] ABSTRACT

In a magneto-optical recording medium including a reading-out layer, which is in an in-plane magnetization state at a room temperature and in a perpendicular magnetization state when the temperature rises, and a recording layer, which is in a perpendicular magnetization state at a room temperature to a Curie point, an intermediate layer having in-plane magnetization component and a lower Curie point than the recording medium is formed between the reading-out layer and the recording layer so as to abruptly change magnetization state of the reading-out layer. Since magnetization state of the reading-out layer is abruptly changed, recording is carried out highdensely. Moreover, since exchange-coupling between the reading-out layer and the recording layer is controlled, a recording characteristic is improved.

19 Claims, 9 Drawing Sheets

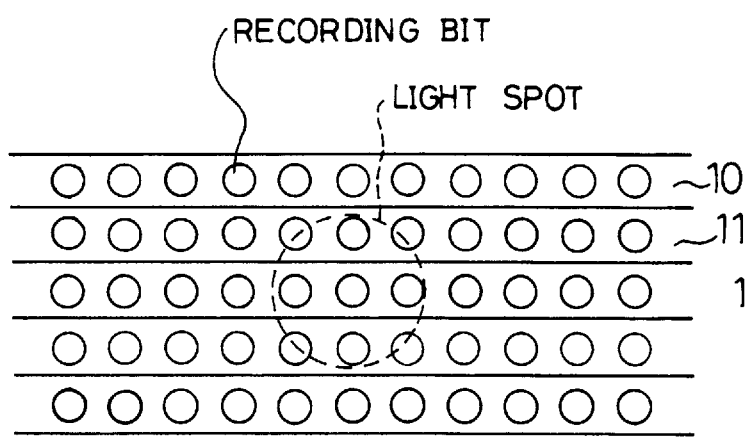
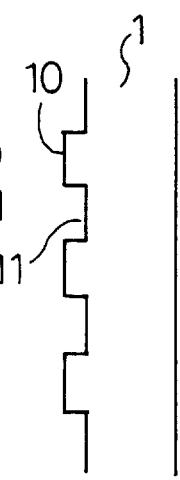
FIG.9(a)
FIG.9(b)

MAGNETO-OPTICAL RECORDING MEDIUM

This application is a continuation, of application Ser. No. 08/395,961 filed Feb. 28, 1995, now abandoned.

FIELD OF THE INVENTION

The present invention relates to a magneto-optical recording medium, such as a magneto-optical disk and a magneto-optical tape, a magneto-optical card, which is applied to a magneto-optical recording apparatus, and recording and reading out methods using the magneto-optical recording medium.

BACKGROUND OF THE INVENTION

As an optical disk memory to which rewriting is capable, a magneto-optical disk memory is put to practical use, but a conventional magneto-optical disk memory has a disadvantage that when a diameter and an interval of a recording bit becomes smaller than a diameter of a converged semiconductor laser beam, a reproducing characteristic is deteriorated. This is because since an adjoining recording bit enters the converged laser beam, recording bits cannot be separately reproduced. In order to solve such a problem, Japanese Unexamined Patent Publication 5-81717/1993 (Tokukaihei 5-81717) discloses a method of separately reproducing recording bits by using a magneto-optical recording medium with a two-layer construction having (1) a reading-out layer, which is an in-plane magnetization film at a room temperature and becomes a vertical magnetization film as temperature rises, and (2) a recording layer which is a vertical magnetization film even if the recording bits are smaller than a diameter of a laser beam.

In Japanese Unexamined Patent Publication 5-81717/1993 (Tokukaihei 5-81717), even if a recording bit is smaller than a diameter of a laser beam, the recording bits can be separately reproduced, but as a recording medium, it is desired that density is further heightened and a recording characteristic is improved.

SUMMARY OF THE INVENTION

It is an object of the present invention to provide a magneto-optical recording medium which is capable of high density recording and reproducing of information.

It is another object of the present invention to provide a magneto-optical recording medium with an excellent recording characteristic.

It is still another object of the present invention to provide a magneto-optical recording method which is capable of high density recording of information.

It is still another object of the present invention to provide a magneto-optical reproducing method which is capable of satisfactorily reproducing high-density information.

In order to achieve the above objects, a first magneto-optical recording medium of the present invention is characterized by including:

a recording layer which is in a perpendicular magnetization state at a room temperature to a Curie point;

a reading-out layer which is in an in-plane magnetization state at a room temperature and is in a perpendicular magnetization state when a temperature rises; and an intermediate layer having in-plane magnetization component and a lower Curie point than the recording layer, the intermediate layer formed between the reading-out layer and the recording layer.

With the above arrangement, since the intermediate layer has in-plane magnetization component, it controls switched connection between the reading-out layer and the recording layer and abruptly changes a state of the reading-out layer. Therefore, reproducing output from a section which adjoins a section to be read out can be decreased. For this reason, high density information is recorded and can be satisfactorily reproduced.

In addition, since the intermediate layer has the in-plane magnetization component, the switched connection between the reading-out layer and the recording layer is weakened. For this reason, magnetic field strength required for recording can be decreased, so a recording characteristic is improved.

In addition, since temperature in the vicinity of the Curie point of the recording layer exceeds the Curie point of the intermediate layer, magnetization of the intermediate layer disappears, magnetic switched connection between the reading-out layer and the recording layer does not exist in the vicinity of the Curie point of the recording layer. For this reason, the magnetic field strength required for recording can be further decreased, thereby further improving the recording characteristic.

A second magneto-optical recording medium of the present invention is characterized by that in the first magneto-optical recording medium, the reading-out layer has a compensation point and a difference in a temperature between the compensation point and the Curie point of the recording layer is not more than 120° C.

With the above arrangement, since the Curie point of the recording layer is adjacent to the compensation point of the reading-out layer, the reading-out layer can be prevented from generating a stray magnetic field in the vicinity of the Curie point of the recording layer. For this reason, the magnetic field strength required for recording can be further decreased, thereby further improving the recording characteristic.

A magneto-optical recording method of the present invention using the first magneto-optical recording medium is characterized by including the step of providing a land section and a groove section on the magneto-optical recording medium so as to carry out recording in both the land section and the groove section.

With the above method, crosstalk can be decreased through recording information on both the land section and the groove section, so the high density information can be recorded.

A magneto-optical reproducing method of the present invention using the first magneto-optical recording medium, is characterized by including the step of optimizing light power for reproducing so that reproducing output becomes largest.

With the above method, a signal of high quality can be reproduced by optimizing light power for reproducing, thereby making it possible to satisfactorily reproduce the high density information, which has been recorded.

For a fuller understanding of the nature and advantages of the invention, reference should be made to the ensuing detailed description taken in conjunction with the accompanying drawings.

BRIEF DESCRIPTION OF THE DRAWINGS

FIG. 9(a) and FIG. 9(b) are explanatory drawings which show a recording and reproducing method using a magneto-optical recording medium.

DESCRIPTION OF THE EMBODIMENTS

The following will discuss one embodiment of the present invention.

Figure 1:
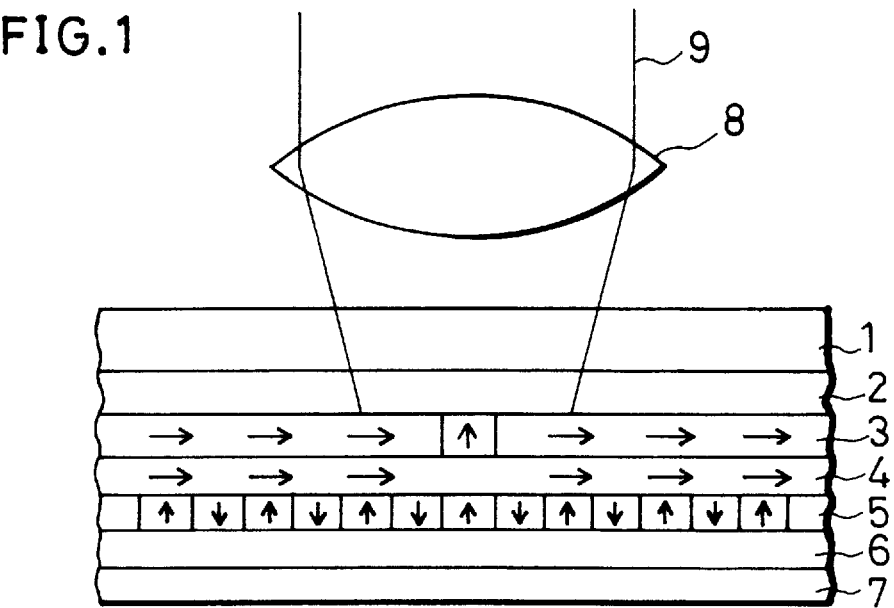
FIG. 1 is an explanatory drawing which shows an arrangement of a magneto-optical recording medium of one embodiment of the present invention.

As shown in FIG. 1, a magneto-optical recording medium of the present invention is arranged so that a substrate 1, a clear dielectric layer 2, a reading-out layer 3, an intermediate layer 4, a recording layer 5, a protecting layer 6, an over coat layer 7 are laminated in this order.

A sample #1 which is one example of the magneto-optical recording medium is formed as follows.

In a sputtering device which has targets of five elements composed of Al, Gd, Dy, Fe and Co, a disk substrate made of polycarbonate having a pre-group and pre-pit was put opposite to the targets, and the sputtering device was evacuated to $1 \times 10^{-6}$ Torr. Thereafter, mixed gas of argon and nitrogen was introduced, electric power was supplied to the target of Al, and a clear dielectric layer 2 made of AlN was formed at gas pressure of $4 \times 10^{-3}$ Torr and at sputtering speed of 12 nm/min. Here, in order to improve a reproducing characteristic, a film thickness of the clear dielectric layer 2 was substantially set to a value which is obtained by dividing ¼ of wavelength of a reproduced light by its refractive index, and for example, if the wavelength of the reproduced light is 800 nm, the film thickness may be approximately 10 nm to 80 nm. In the present embodiment, the film thickness was 60 nm.

Next, after the sputtering device was again evacuated to $1 \times 10^{-6}$ Torr, argon gas was introduced, and electric power was supplied to the targets of Gd, Fe and Co so that a reading-out layer 3 with a film thickness of 50 nm composed of $Gd_{0.26}(Fe_{0.82}Co_{0.18})_{0.74}$ was formed at gas pressure of $4 \times 10^{-3}$ Torr and at sputtering speed of 12 nm/min. The reading-out layer 3 was in an in-plane magnetization state at a room temperature and was in a perpendicular magnetization state at a temperature of not less than 100° C. The read-out layer 3 did not have a compensation point and had a Curie point of 320° C.

Next, electric power which is supplied to each target was adjusted, and an intermediate layer 4 with a film thickness of 10 nm composed of $Gd_{0.35}(Fe_{0.82}Co_{0.18})_{0.65}$ was formed under the same condition. The intermediate layer 4 was an in-plane magnetization film having a Curie point of 340° C.

Next, the electric power supplied to Gd is stopped, and electric power is supplied to the target of Dy so that a recording layer 5 with a film thickness of 50 nm composed of $Dy_{0.23}(Fe_{0.78}Co_{0.22})_{0.77}$ was formed under the same condition. The recording layer 5 was a perpendicular magnetization film having a compensation point which was substantially same as a room temperature, and its Curie point was 200° C.

Next, mixed gas composed of argon and nitrogen was introduced and electric power was supplied to the target of Al so that the protecting layer 6 composed of AlN was formed at gas pressure of $4 \times 10^{-3}$ Torr and at sputtering speed of 12 nm/min. Here, a protecting layer 6 may have a film thickness so that magnetic layers can be protected against corrosion due to oxidation, etc., so in the present embodiment, the thickness was 50 nm.

Next, an over coat layer 7 was formed by applying UV hardening resin by means of spin coat and by emitting an ultraviolet ray. Here, instead of the UV hardening resin, heating may be made by applying thermohardening resin by means of spin coat.

Figure 2:
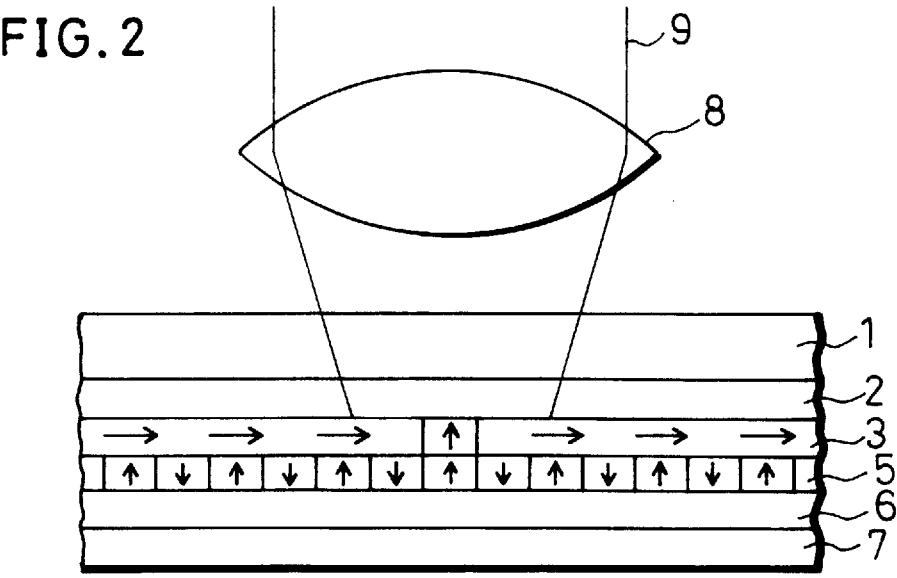
FIG. 2 is an explanatory drawing which shows an arrangement of a magneto-optical recording medium for comparison.

For comparison, a magneto-optical recording medium having an arrangement shown in FIG. 2 without an intermediate layer 4 which is disclosed in Japanese Unexamined Patent Publication No. 5-81717/1993 (Tokukaihei 5-81717) was formed as a comparative sample #51 in the same manner as that of the sample #1.

Next, the following will discuss a reproducing characteristic of the magneto-optical recording medium of the present embodiment.

Figure 3:
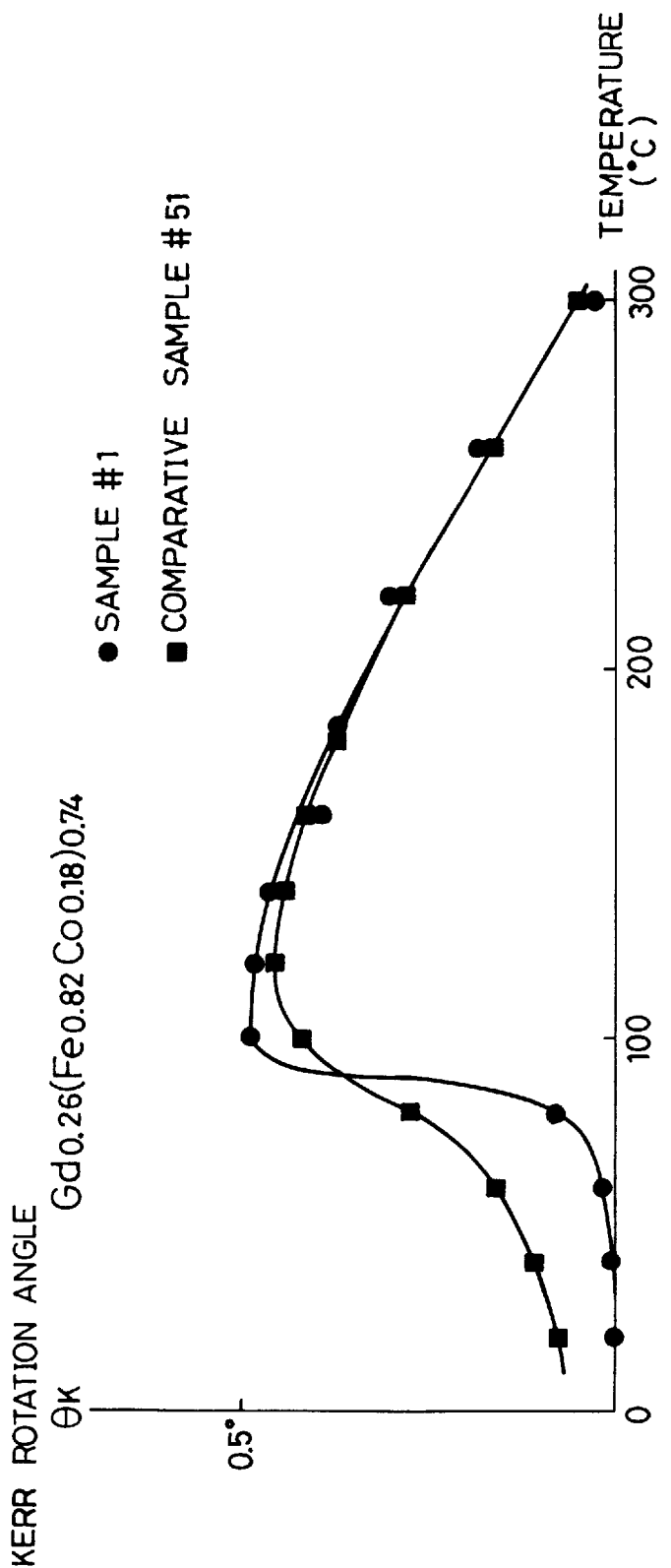
FIG. 3 is a graph which shows a magnetic characteristic of a magneto-optical recording medium.

FIG. 3 shows a result of measuring a temperature dependency of a Kerr rotation angle from the reading-out layer side in the sample #1 and the comparative sample #51.

In the case where a minute recording bit which is smaller than a light beam spot is reproduced, since reproducing output from an adjoining recording bit is decreased, reproducing output is not generated from a section other than a section where a temperature rises. Therefore, it is desirable that high reproducing output can be obtained only in the section where the temperature rises. For this reason, in this case the minute recording bit which is smaller than the light beam spot is reproduced by using the reading-out layer 3 which is in an in-plane magnetization state at a room temperature and in a perpendicular magnetization state at a high temperature. As a result the reading-out layer 3 is completely in the in-plane magnetization state in the section other than the section where a temperature rises, and it does not have the Kerr rotation angle. Meanwhile, it is desirable that the section where the temperature rises is completely in the perpendicular magnetization state.

In order to decrease the reproducing output interferences from the adjoining recording bit, it is desirable that the Kerr rotation angle increases abruptly at not less than a certain temperature (approximately 100° C.) in the temperature dependency of the Kerr rotation angle.

In FIG. 3, the comparative sample #51 has a certain Kerr rotation angle even at a room temperature, and the Kerr rotation angle gradually increases around at 80° C. On the contrary, as to the sample #1, its Kerr rotation angle is substantially 0 at a room temperature, and it increases abruptly at 90° C. Therefore, reproducing output interference from a section which adjoins a section to be read out can be decreased. This makes it clear that the sample #1 can obtain a more excellent reproducing characteristic than that of the comparative sample #51.

Next, as a sample #2 of the present embodiment, a magneto-optical recording medium in which composition of the reading-out layer 3 was changed to $Gd_{0.23}(Fe_{0.56}Co_{0.44})_{0.77}$ was formed in the same manner as that of the sample #1. As to this magneto-optical recording medium, the reading-out layer 3 was in the in-plane magnetization state at a room temperature and was in the perpendicular magnetization state at not less than 100° C., and its compensation point was 260° C. and its Curie point was 450° C. Except that, the sample #2 is the same as the sample #1.

For comparison, a magneto-optical recording medium having an arrangement shown in FIG. 2 without an intermediate layer 4, which is disclosed in Japanese Unexamined Patent Publication 5-81717/1993 (Tokukaihei 5-81717) was formed as a comparative sample #52 in the same manner as that of the sample #2.

Figure 4:
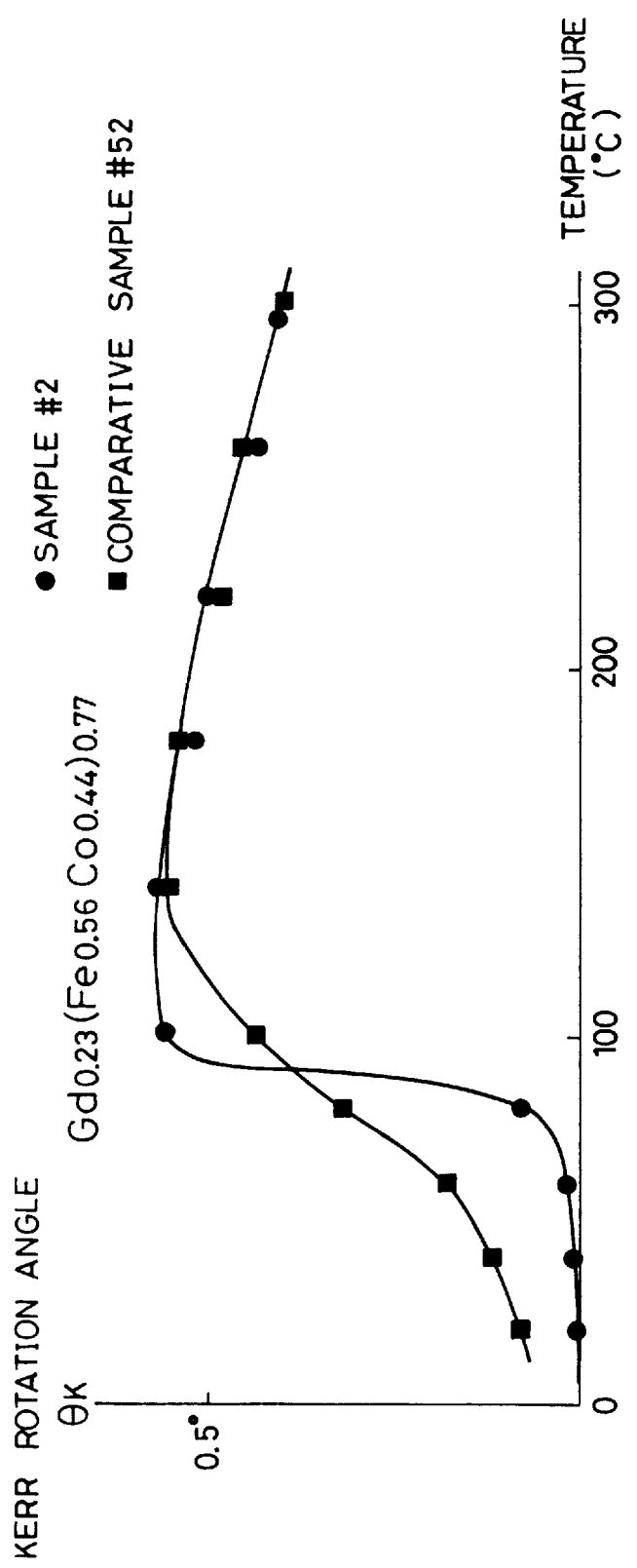
FIG. 4 is a graph which shows a magnetic characteristic of a magneto-optical recording medium.

FIG. 4 is a result of measuring a temperature dependency of the Kerr rotation angle from the reading-out layer 3 side in the sample #2 and the comparative sample #52.

As is clear from FIGS. 3 and 4, the Kerr rotation angle in the perpendicular magnetization state is larger in the samples 2 and 52 than in the samples 1 and 51. Namely, the Kerr rotation angle in the perpendicular magnetization state can be relatively increased by changing the component of the reading-out layer 3 from $Gd_{0.26}(Fe_{0.82}Co_{0.18})_{0.74}$ to $Gd_{0.23}(Fe_{0.56}Co_{0.44})_{0.77}$ and by raising the Curie point. As to a magneto-optical recording medium, the higher its Curie point becomes, the larger the Kerr rotation angle in the perpendicular magnetization state becomes, so reproducing output becomes large.

Also in this case, similarly to the case in FIG. 3, as to temperature dependency of the Kerr rotation angle, it is desirable that the Kerr rotation angle abruptly increases at not less than a certain temperature (approximately 100° C.). Thus the reading-out layer has a perpendicular magnetization in all temperature ranges which are higher than a temperature higher than room temperature (i.e., 100° C. in the above example).

However, as to the comparative sample #52 shown in FIG. 4, raising of a Kerr rotation angle is gentler than that of the comparative sample #51.

Meanwhile, as to the sample #2, the Kerr rotation angle at a room temperature is substantially 0 and it abruptly increases at 90° C. Therefore, reproducing output leaking from an adjoining section to the section to be read out can be decreased. As a result, similarly to the sample #1, a magneto-optical recording medium as the sample #2 can obtain an excellent reproducing characteristic.

The above discussed the reproducing characteristic of the magneto-optical recording medium according to the present embodiment. Next, the following will discuss a recording characteristic of the magneto-optical recording medium.

As to a sample #3 which is another example of the magneto-optical recording medium according to the present embodiment, the intermediate layer 4 of the sample #1 composed of $Gd_{0.35}(Fe_{0.82}Co_{0.18})_{0.65}$ is changed to an intermediate layer 4 composed of $(Gd_{0.80}Dy_{0.20})_{0.42} Fe_{0.58}$, and a Curie point of the intermediate layer 4 is 180° C. which is lower than that of a recording layer 5. Furthermore, the intermediate layer 4 is an in-plane magnetization film at a room temperature to a high temperature.

Figure 5:
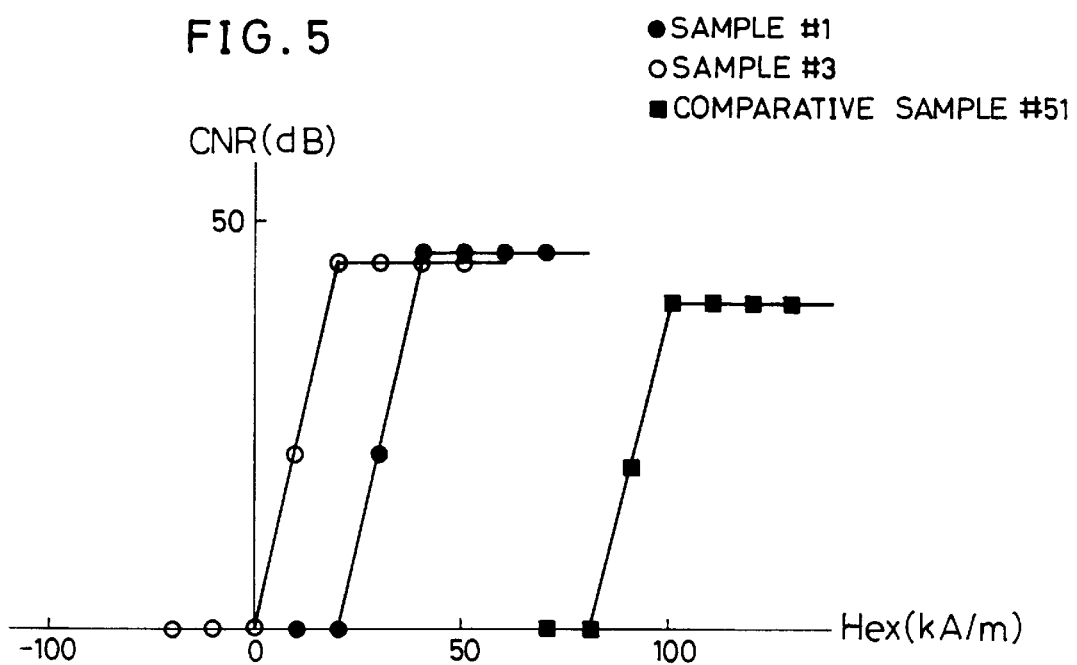
FIG. 5 is a graph which shows a recording/reproducing characteristic of a magneto-optical recording medium.

FIG. 5 shows a recording magnetic field (represented by Hex in the drawing) dependency of CNR (a ratio of a signal to a noise) in the comparative sample #51, the sample #1 and the sample #3.

As a measuring optical system, a semiconductor laser with a wavelength of 780 nm and an objective lens with NA (numerical aperture) of 0.55 are used.

First, a laser beam was irradiated and focused on a land of a disk, and a magnetizing direction of the recording layer 5 was arranged regularly. Thereafter, a laser beam with a power of 6 mW was pulsatively irradiated at linear velocity of 5 m/s so that a recording bit with a length of 0.5 μm was formed at a pitch of 1.0 μm. Thereafter, a laser power for reproducing was adjusted to be 2.1 mW and CNR was measured.

Magnetic field strength which is required for recording can be judged from the recording magnetic field dependency. In other words, as an absolute value of a magnetic field where CNR is saturated becomes smaller, recording can be carried out in a weaker magnetic field, namely, the recording is easy to be carried out.

In the comparative sample #51, the reading-out layer 3 exists so as to come in contact with the recording layer 5, and since the Curie point of the reading-out layer 3 is higher than that of the recording layer 5, the reading-out layer 3 is strongly in switched connection with the recording layer 5. This requires a strong magnetic field of 100 kA/m for recording.

On the contrary, in the sample #1 of the present embodiment, necessary magnetic field strength is 40 kA/m which is low. In other words, the switched connection between the reading-out layer 3 and the recording layer 5 are weakened by providing the intermediate layer 4 in the in-plane magnetization state composed of $Gd_{0.35}(Fe_{0.82}Co_{0.18})_{0.65}$. For this reason, the magnetic field strength required for recording is decreased, and the recording characteristic is improved.

Next, in the sample #3, necessary magnetic field strength is 20 kA/m which is further lower. In other words, exchange-coupling between the reading-out layer 3 and the recording layer 5 is released in the vicinity of the Curie point of the recording layer 5 by providing the intermediate layer 4 in the in-plane magnetization state composed of $(Gd_{0.80}Dy_{0.20})_{0.42} Fe_{0.58}$ with a lower Curie point than that of the recording layer 5. For this reason, the magnetic field strength required for recording is further decreased, and the recording characteristic is further improved.

As to a sample #4 which is another example of the magneto-optical recording medium according to the present embodiment, the intermediate layer 4 of the sample #2 composed of $Gd_{0.35}(Fe_{0.82}Co_{0.18})_{0.65}$ is changed to an intermediate layer 4 composed of $(Gd_{0.80}Dy_{0.20})_{0.42} Fe_{0.58}$, and a Curie point of the intermediate layer 4 is lower than that of a recording layer 5, namely, 180° C. Moreover, the intermediate layer 4 is the in-plane magnetization film at a room temperature to a high temperature.

Figure 6:
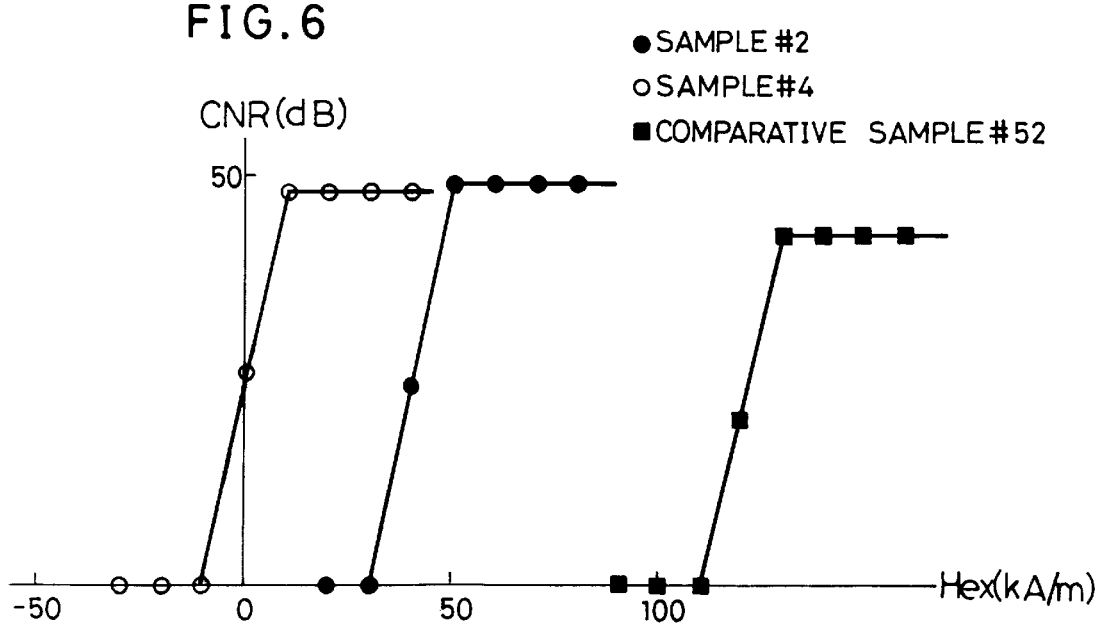
FIG. 6 is a graph which shows a recording/reproducing characteristic of a magneto-optical recording medium.

FIG. 6 shows a property that CNR depends upon a strength of a recording magnetic field in the comparative sample #52, the sample #2 and the sample #4.

First, after a magnetizing direction of the recording layer 5 was arranged regularly, a laser beam with power of 6 mW was pulsatively irradiated at linear velocity of 5 m/s so that a recording bit with a length of 0.5 μm was formed at a pitch of 1.0 μm. Thereafter, a laser power for reproducing was adjusted to be 2.1 mW and CNR was measured.

In the comparative sample #52, the reading-out layer 3 exists so as to come in contact with the recording layer 5, and since the Curie point of the reading-out layer 3 is higher than that of the recording layer 5, the exchange-coupling between the reading-out layer 3 and the recording layer 5 is very strong Moreover, the increasing of the Curie point of the reading-out layer 3 further strengthen the exchange-coupling compared to the sample #51. This requires a stronger magnetic field of 130 kA/m for recording in the sample #52.

On the contrary, in the sample #2 of the present embodiment, necessary magnetic field strength is 50 kA/m which is low. In other words, the exchange-coupling between the reading-out layer 3 and the recording layer 5 are weakened by providing the intermediate layer 4 in the in-plane magnetization state composed of $Gd_{0.35}(Fe_{0.82}Co_{0.18})_{0.65}$. For this reason, the magnetic field strength required for recording is decreased, and the recording characteristic is improved.

Next, in the sample #4, necessary magnetic field strength is 10 kA/m which is lower. In other words, exchange-coupling between the reading-out layer 3 and the recording layer 5 is released in the vicinity of the Curie point of the recording layer 5 by providing the intermediate layer 4 in the in-plane magnetization state composed of $(Gd_{0.80}Dy_{0.20})_{0.42}Fe_{0.58}$ with a lower Curie point than that of the recording layer 5. For this reason, the magnetic field strength required for recording is further decreased, and the recording characteristic is further improved.

In addition, since the Curie point of the recording layer 5 is adjacent to a compensation point of the reading-out layer 3, a stray magnetic field generated from the reading-out layer 3 is decreased in the vicinity of the Curie point of the recording layer 5. For this reason, the recording characteristic is further improved. This will be mentioned below.

Figure 7:
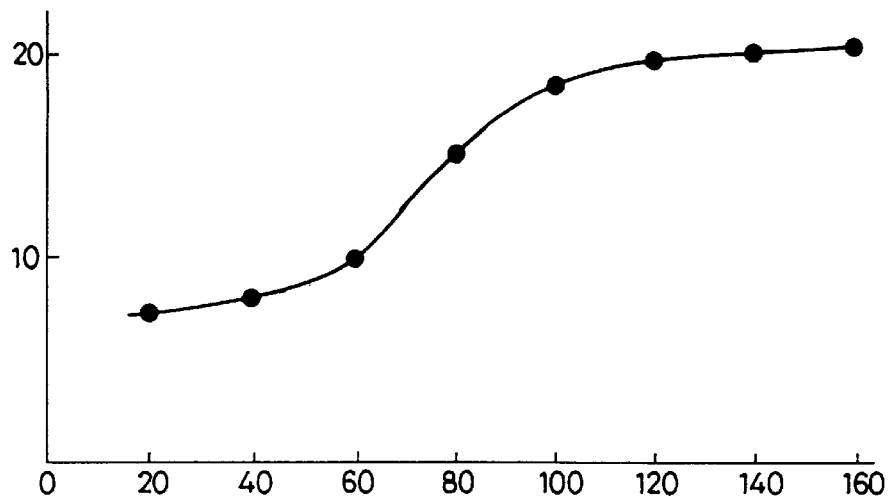
FIG. 7 is a graph which shows a recording/reproducing characteristic of the magneto-optical recording medium in FIG. 1.

FIG. 7 shows a result of examination in the sample #4 as to how the magnetic field strength required for recording changes in the case where composition of the reading-out layer 3 is adjusted and its compensation point is shifted. A horizontal axis represents a difference between the compensation point of the reading-out layer 3 and the Curie point of the recording layer 5 (200° C.), and a vertical axis represents the magnetic field strength required for recording in the magneto-optical recording medium. It is clear from the drawing that in the case where the difference between the Curie point (200° C.) of the recording layer 5 and the compensation point of the reading-out layer 3 is not more than 120° C., the magnetic field strength required for recording starts to be decreased. Namely, when the compensation point of the reading-out layer 3 is set in proximity to the Curie point of the recording layer 5 so that the difference becomes not more than 120° C., the stray magnetic field generated from the reading-out layer 3 is reduced in the vicinity of the Curie point of the recording layer 5. Therefore, the recording characteristic is further improved as mentioned above.

Next, the following will discuss features of a magneto-optical reproducing method of the present embodiment.

Figure 8:
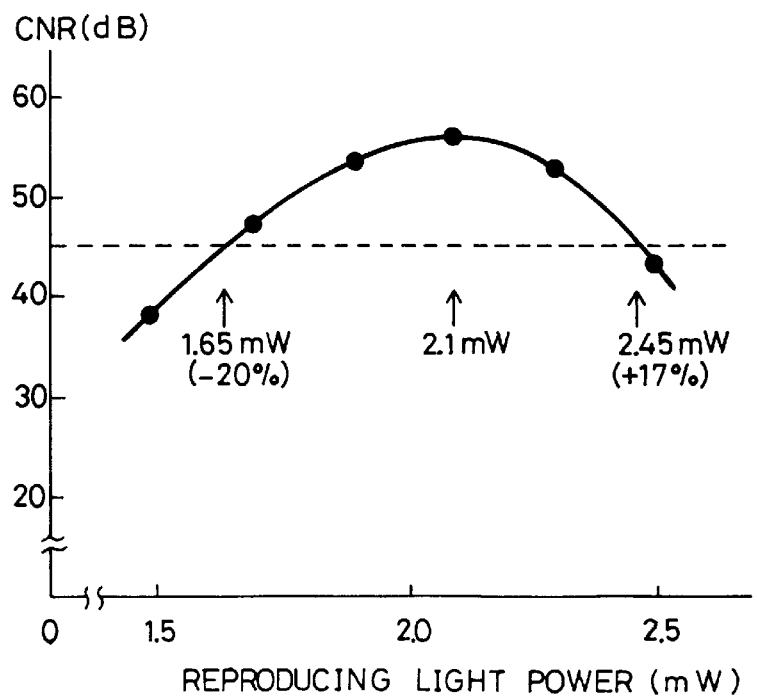
FIG. 8 is a graph which shows a recording/reproducing characteristic of the magneto-optical recording medium in FIG. 1.

FIG. 8 shows a property that CNR depends upon a reproduced light power in the case where a recording bit with a length of 0.5 μm is uniformly formed in the sample #1 at a pitch of 1.0 μm and a recording bit string is reproduced. When the reproduced light power is increased, a temperature rises in the reading-out layer 3, so an area in the perpendicular magnetization state is enlarged. Therefore, as the reproduced light power increases, CNR becomes gradually larger. However, when the reproduced light power is further increased beyond 2.1 mW, even a section of the adjoining recording bit is in the perpendicular magnetization state, so there occurs lowering of CNR. This state is observed in all the samples #1, 2 and 3.

For this reason, in the magneto-optical reproducing method of the present embodiment, the reproduced light power is optimized as follows by using the magneto-optical recording medium of the present embodiment. In other words, CNR of at least 45 dB and more is generally required for the magneto-optical recording. Therefore, according to dependency shown in FIG. 8, the reproduced light power is set within a range of −20%(1.65 mW) to +17%(2.45 mW) with respect to 2.1 mW which is optimum laser power. As a result, CNR becomes not less than 45 dB. This makes it possible to reproduce a signal of high quality, thereby making it possible to satisfactorily reproduce high-density information which has been recorded high-densely.

Next, in the magneto-optical reproducing method of the present embodiment, recording is carried out in both a land and a groove with a same width of the magneto-optical recording medium. Namely, as shown in FIG. 9(a) and 9(b), a magneto-optical recording medium is formed on a disk substrate where a land 10 and a groove 11 with a same width are formed at a pitch of 1.4 μm.

In this case, at the time of reproducing, the light spot is tracked in order to reproduce a signal in a land section in the center. However, in a magneto-optical recording medium where high-density recording is carried out, a width of the land 10 becomes smaller than a diameter of the light spot. As a result, the light beam is irradiated extendedly to an adjoining groove 11. For this reason, in a conventional magneto-optical recording medium, an objective reproduced signal from the land 10 as well as a reproduced signal from the adjoining groove 11 are detected and crosstalk occurs, thereby deteriorating quality of a signal.

In the comparative samples #51 and 52, since their crosstalk is approximately −27 dB, which means large, quality of the reproduced signal is low. On the contrary, in the samples of the present embodiment #1, 2, 3 and 4, their crosstalk is approximately −35 dB to −37 dB, which means that the crosstalk is restricted low.

As mentioned above, in the magneto-optical reproducing method of the present embodiment, recording is carried out in both the land and the groove by using the magneto-optical recording medium of the present embodiment. This can decrease crosstalk at the time of reproducing, so high density information can be recorded.

Here, the magneto-optical recording medium of the present invention is not limited to the constitution of the samples #1, 2, 3 and 4.

An intermediate layer does not require a complete in-plane magnetization state, so even if its magnetization slightly inclines to a face of the film, exchange-coupling between a reading-out layer and a recording layer can be controlled as long as the intermediate layer has in-plane magnetization component. This makes it possible to obtain an effect that a recording characteristic is improved.

In the case where the intermediate layer 4 is composed of GdFeCo likewise the samples #1 and 2, for example, such an in-plane magnetization state is realized on RE rich composition side, which includes much rare earth metal for compensation composition and on TM rich composition side which includes much transition metals for the compensation composition. As is clear from this, the composition of the intermediate layer 4 is not limited to $Gd_{0.35}(Fe_{0.82}Co_{0.18})_{0.65}$. In the case where an intermediate layer is represented by $Gd_X(Fe_YCo_{1-Y})_{1-X}$ likewise the samples #1 and 2, it is preferable that the composition is set so as to fall in a range of TMrich ($0.05 \leq X \leq 0.17$ and $0 \leq Y \leq 1$) or a range of RErich ($0.30 \leq X \leq 0.95$ and $0 \leq Y \leq 1$). Since this realizes the in-plane magnetization state which is required in the present invention, high-density information, which has been recorded, can be satisfactorily reproduced and magnetic field strength required for recording can be reduced, thereby improving the recording characteristic.

When $X<0.05$ or $0.95<X$, noise due to polycrystalization in the intermediate layer 4 remarkably increases. As a result, it is difficult to obtain an excellent reproducing characteristic and in-plane magnetic anisotropy becomes too strong, so a satisfactory exchange-coupling state cannot be realized. Therefore, it is difficult that the reading-out layer 3 is in the perpendicular magnetization state as a temperature rises.

Figure 10:
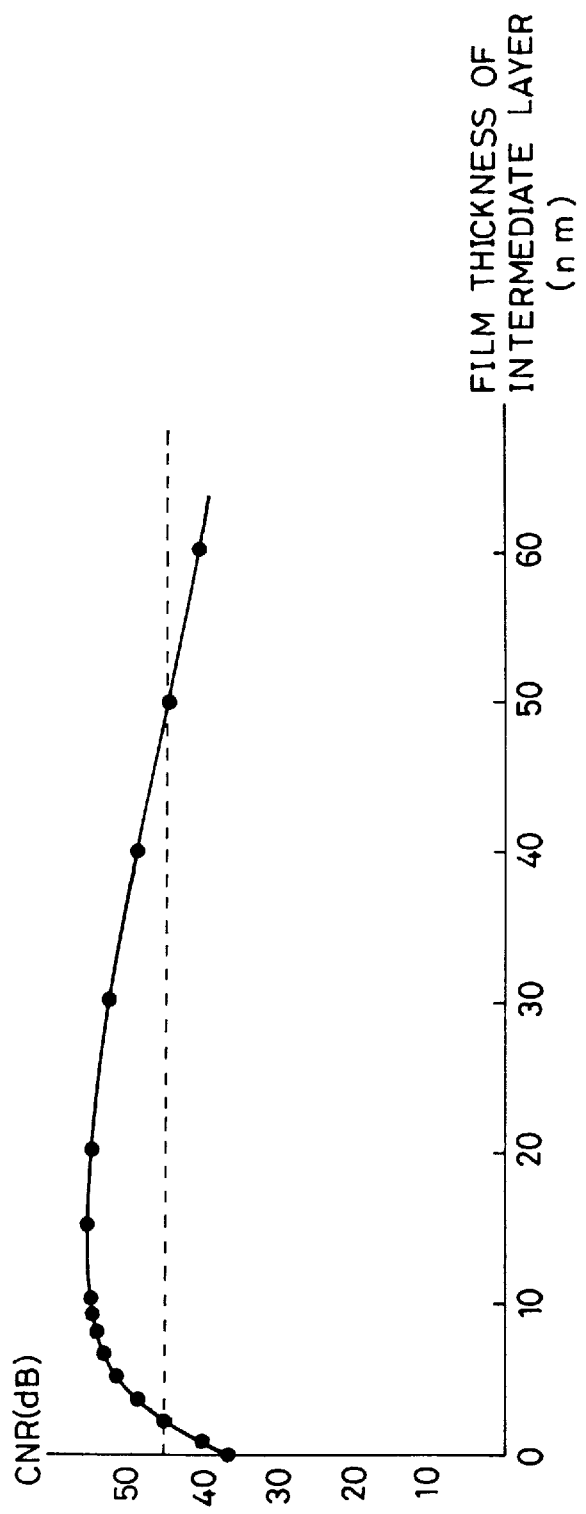
FIG. 10 is a graph which shows a recording/reproducing characteristic of the magneto-optical recording medium in FIG. 1.

In addition, in the samples #1 and 2, the case where a film thickness of the intermediate layer 4 is 10 nm was illustrated, but a film thickness of the intermediate layer of the present invention is not limited to this. FIG. 10 shows a reproduced characteristic which has been examined at the time when the film thickness of the intermediate layer 4 in the constitution of the sample #1 is changed. As a recording bit, similarly to the time of measuring magnetic field dependency, a recording bit with a length of 0.5 μm was formed at a pitch of 1.0 μm.

As is clear from FIG. 10, when the film thickness of the intermediate layer 4 becomes small, an effect due to provision of the intermediate 4 is decreased, so a structure of the magneto-optical recording medium approaches a state which is similar to a two-layer structure that the intermediate layer 4 does not essentially exist. For this reason, CNR is lowered. Moreover, when the film thickness of the intermediate layer 4 becomes large, the exchange-coupling strength which acts from the recording layer 5 to the reading-out layer 3 becomes too weak, so it is hard to obtain an excellent reproducing characteristic. Therefore, CNR is lowered. Generally, in order to easily carrying out digital recording, CNR of not less than 45 dB is required. For this reason, it is preferable that the film thickness of the intermediate layer 4 is from 2 nm to 50 nm. As a result, it is possible to obtain CNR of not less than 45 dB, so digital recording is easily carried out.

Similarly to the case of the samples #1 and 2, in the case where the intermediate layer 4 is composed of GdDyFe in the samples #3 and 4, the in-plane magnetization state is realized on RErich composition side, which includes much rare earth metal for compensation composition and on TM rich composition side which includes much transition metals for compensation composition. As is clear from this, the composition of the intermediate layer 4 is not limited to $(Gd_{0.80}Dy_{0.20})_{0.42}Fe_{0.58}$. In the case where an intermediate layer is represented by $(GdYDy_{1-Y})_XFe_{1-X}$ likewise the samples #3 and 4, it is preferable that the composition is set so as to fall in a range of TMrich ($0.05 \leq X \leq 0.15$ and $0.3 \leq Y \leq 1.0$) or in a range of RErich ($0.35 \leq X \leq 0.95$ and $0.3 \leq Y \leq 1.0$). Since this realizes the in-plane magnetization state which is required in the present invention, information, which has been recorded, can be satisfactorily reproduced and magnetic field strength required for recording can be decreased, thereby improving the recording characteristic.

When $X<0.05$ or $0.95<X$, noise due to polycrystalization in the intermediate layer 4 remarkably increases likewise the samples #1 and 2. As a result, it is difficult to obtain an excellent reproducing characteristic and in-plane magnetic anisotropy becomes too strong, so a satisfactory exchange-coupling state cannot be realized. Therefore, it is difficult that the reading-out layer 3 is in a perpendicular magnetization state as a temperature rises.

In addition, in a range of $Y<0.3$, when Dy content of the intermediate layer 4 rises, a Curie point of the intermediate layer 4 is not more than 130° C., and magnetic connection between the recording layer 5 and the reading-out layer 3 becomes too weak. Therefore, satisfactory reproducing cannot be carried out, which is not preferable.

In addition, in a range of $0.3 \leq Y \leq 0.85$, the Curie point of the intermediate layer 4 becomes the Curie point of the recording layer 5 of the present embodiment (200° C.), so a recording magnetic field which relates to the samples #3 and 4 can be decreased.

In addition, in a range of $0.85 \leq Y \leq 1.0$, the Curie point of the intermediate layer 4 becomes not less than the Curie point of the recording layer 5 of the present embodiment (200° C.). As a result, an effect due to the decrease in the recording magnetic field becomes small, but an effect which is similar to the samples #1 and 2 can be obtained.

Furthermore, in the samples #3 and 4, the case where the film thickness of the intermediate layer 4 is 10 nm is illustrated, but the film thickness of the intermediate layer of the present invention is not limited to this similarly to the samples #1 and 2. In other words, it is preferable that the film thickness of the intermediate layer 4 is from 2 nm to 50 nm. This makes it possible to obtain CNR of not less than 45 dB, thereby easily carrying out digital recording.

In addition, a material of the intermediate layer 4 is not particularly limited, and besides GdFeCo and GdDyFe mentioned in the present embodiment, DyFeCo, GdDyFeCo, GdTbFe, TbFeCo, GdTbFeCo, etc. are suitable for a magnetic material which can realize the in-plane magnetization state.

Composition of GdFeCo of the reading-out layer 3 is not limited to the above $Gd_{0.26}(Fe_{0.82}Co_{0.18})_{0.74}$ and $Gd_{0.23}(Fe_{0.56}Co_{0.44})_{0.77}$. In accordance with the point of the present invention, the reading-out layer 3 may be in an in-plane magnetization state at a room temperature and may be changed over from the in-plane magnetization state to a perpendicular magnetization state at a temperature which is higher than the room temperature. In an alloy of rare earth metal and transition metals, a compensation point which allows magnetization of the rare earth metal to balance with magnetization of the transition metals is changed by changing a ratio of the rare earth metal to the transition metals. Since GdFeCo is a material which shows perpendicular magnetization in the proximity of the compensation point, a temperature which changes the in-plane magnetization state into the perpendicular magnetization state is changed by changing a ratio of Gd to FeCo.

The following will discuss the ratio.

Figure 11:
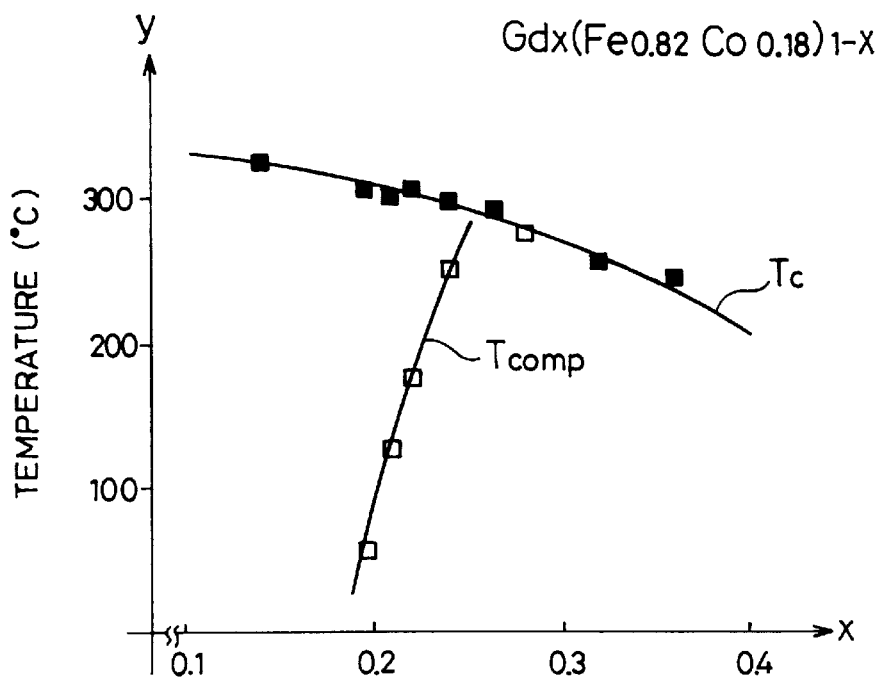
FIG. 11 is a graph which shows a magnetic characteristic of a reading-out layer which is provided in the magneto-optical recording medium in FIG. 1.

FIG. 11 is a result of measuring a compensation point and a Curie point in the case where X, namely, composition of Gd is changed in the reading-out layer 3 composed of a system of $Gd_X(Fe_{0.82}Co_{0.18})_{1-X}$. In the drawing, the Curie point is represented by Tc and the compensation point by Tcomp.

As is clear from the drawing, as to a composition range that the compensation point is not less than a room temperature (here, 25° C.), "X is not less than 0.18", and more preferably, in a range of $0.19<X<0.29$. With this range, in an arrangement for practical use that the reading-out layer 3 and the recording layer 5 are laminated, a temperature which changes the magnetization from an in-plane direction to a vertical direction is in a range of a room temperature to 200° C. When this temperature extremely rises, laser power for reproducing becomes as high as laser power for recording. As a result, recording to the recording layer 5 is carried out, so there is possibility of disturbing recorded information in the recording layer 5.

Next, the following will discuss a change in a characteristic in the case where a value of Y, which is an index of a ratio of Fe to Co is changed in the reading-out layer 3 composed of a system of $Gd_X(Fe_{1-Y}Co_Y)_{1-X}$.

Figure 12:
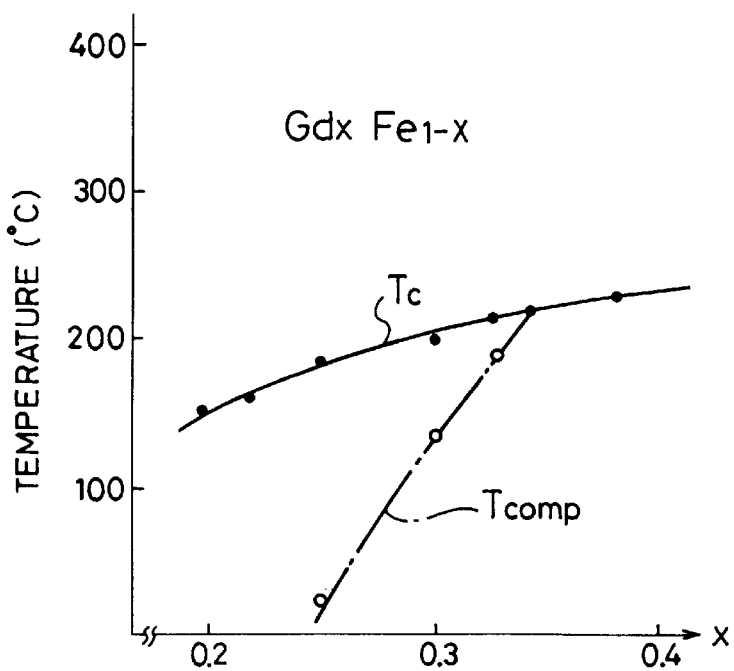
FIG. 12 is a graph which shows a magnetic characteristic of a reading-out layer which is provided in the magneto-optical recording medium in FIG. 1.
Figure 13:
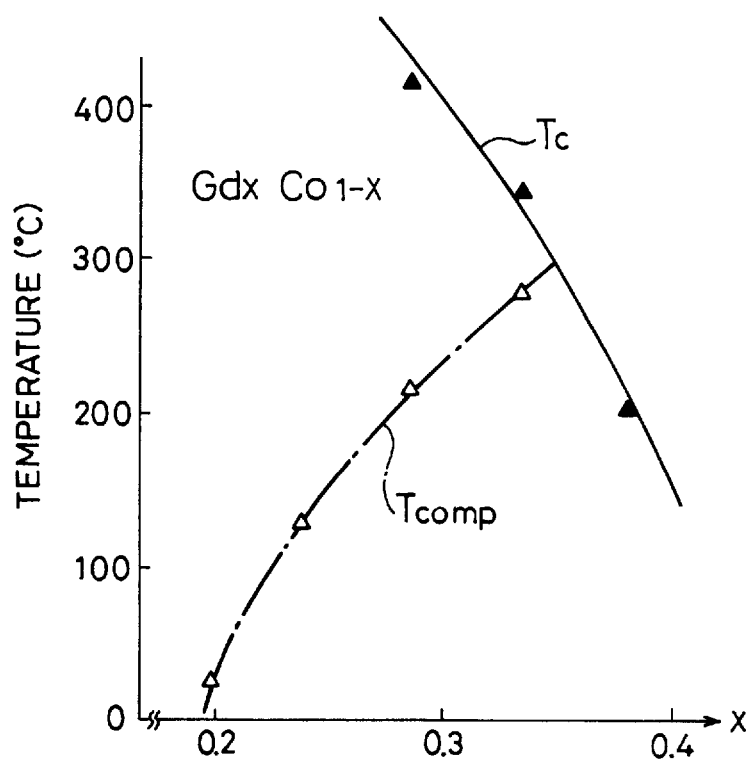
FIG. 13 is a graph which shows a magnetic characteristic of a reading-out layer which is provided in the magneto-optical recording medium in FIG. 1.

FIG. 12 is a drawing which shows a characteristic in the case where Y is 0, namely, $Gd_XFe_{1-X}$. In the drawing, a Curie point is represented by Tc and a compensation point by Tcomp. In the drawing, in the case where composition X of GD is 0.3, for example, the compensation point is approximately 120° C. and the Curie point is approximately 200° C. Meanwhile, FIG. 13 is a drawing which shows a characteristic in the case where Y is 1, namely $Gd_XCo_{1-X}$. In the drawing, a Curie point is represented by Tc and a compensation point by Tcomp. In the drawing, in the case where composition X of Gd is 0.3, the compensation point is approximately 220° C. and the Curie point is approximately 400° C. Therefore, it is clear that even if the composition of Gd is same, the compensation point and the Curie point rise when an amount of Co increases.

Generally, when a Curie point becomes high, a pole Kerr rotation angle increases. It is advantageous that the pole Kerr rotation angle is as large as possible at the time of reproducing because a high CN ratio can be obtained. However, care should be taken not to increase an amount of Co too much. If so, a temperature, which changes the magnetization of the reading-out layer 3 from an in-plane direction to a vertical direction, becomes high.

Taking these points into consideration, it is preferable that a value Y of an amount of Co in $Gd_X(Fe_{1-Y}Co_Y)_{1-X}$ is in a range of 0.1<Y<0.5.

A characteristic of a temperature, etc., which changes the reading-out layer 3 composed of GdFeCo from an in-plane magnetization state to a perpendicular magnetization state is justly influenced by composition, a film thickness, etc. of the intermediate layer 4 and the recording layer 5. This is because magnetic exchange-coupling strength acts between the reading-out layer 3 and the recording layer 5. Therefore, it is clear that optimum composition and a film thickness of the reading-out layer 3 are changed with materials, composition and film thickness of the intermediate layer 4 and the recording layer 5.

As mentioned above, as the materials of the reading-out-layer of the magneto-optical recording medium according to the present invention, GdFeCo which abruptly changes an in-plane magnetization state into a perpendicular magnetization state is most suitable, but an alloy of rare earth metal and transition metals, mentioned below, can provide a same effect.

As shown in FIG. 12, $Gd_XFe_{1-X}$ is in a range of 0.24<X<0.35, and it has a characteristic that a compensation point is higher than a room temperature. Moreover, as shown in FIG. 13, $Gd_XCo_{1-X}$ is in a range of 0.20<X<0.35, and it has a characteristic that a compensation point is higher than a room temperature.

$Tb_X(Fe_{1-Y}Co_Y)_{1-X}$, which is a material besides GdFeCo where FeCo alloy is used as transition metals, is in a range of 0.20<X<0.30 (at this time, Y is an arbitrary value from 0 to 1), and it has a compensation point which is higher than a room temperature. $Dy_X(Fe_{1-Y}Co_Y)_{1-X}$ is in a range of 0.24<X<0.33 (at this time, Y is an arbitrary value from 0 to 1), and it has a compensation point which is higher than a room temperature. $Ho_X(Fe_{1-Y}Co_Y)_{1-X}$ is in a range of 0.25<X<0.45 (at this time, Y is an arbitrary value from 0 to 1), and it has a compensation value which is higher than a room temperature.

In the case where a wavelength of a semiconductor laser which is a light source of an optical pickup is shorter than 780 nm, mentioned above, besides the above materials, a material which has a large pole Kerr rotation angle on this wavelength is also suitably used as a material of the reading-out layer of the present invention.

In an optical disk such as a magneto-optical disk, strength of a light beam controls recording density. The strength of a light beam is determined by a wavelength of a laser and a numerical aperture of an objective lens. Therefore, if a laser with a shorter wavelength appears, recording density of an magneto-optical disk is improved. At the present time, a semiconductor laser with a wavelength of 670 to 680 nm has substantially been put to practical use, and a laser using SHG element (the Second Higher Harmonics Generating Element) with a wavelength of not more than 400 nm is also studied vigorously.

A pole Kerr rotation angle of an alloy of rare earth metal and transition metals has wavelength dependency. Generally, when a wavelength becomes short, the pole Kerr rotation angle is decreased. At this time, if a film with a short wavelength and a large pole Kerr rotation angle is used, signal becomes large, thereby making it possible to provide a magneto-optical disk which can obtain a reproduced signal with high quality.

Here, the film thickness of the reading-out layer 3 is 50 nm, but the film thickness is not limited to this.

As shown in FIG. 1, information is recorded and reproduced from the reading-out layer 3 side. However, if the film thickness of the reading-out layer 3 is too thin, the information recorded on the recording layer 5 is read out, so a masking effect due to the in-plane magnetization of the reading-out layer 3 is decreased.

As mentioned above, since a magnetic characteristic of the reading-out layer 3 is influenced by the recording layer 5, a suitable film thickness of the reading-out layer 3 changes with materials and composition, but it is preferable that the film thickness of the reading-out layer 3 is not less than 20 nm. Moreover, not less than 50 nm is more preferable. Further, if the film thickness is too thick, information on the recording layer 5 is not transferred to the reading-out layer 3, so reproducing is not appropriately carried out. Therefore, it is preferable that the film thickness is approximately not more than 100 nm.

Here, as the material of the recording layer 5, a material, which is developed and used for a conventional magneto-optical disk, namely, a material, which provides perpendicular magnetization from a room temperature to a Curie point, is used. It is preferable to recording that the Curie point is approximately 150° C. to 250° C., but the Curie point is not particularly limited to this.

In the present embodiment, DyFeCo is adopted as the recording layer 5. DyFeCo is a material with small vertical magnetic anisotropy. For this reason, even if an external magnetic field required at the time of recording is low, recording can be carried out. This is a very advantageous point particularly in a magnetic field modulating overwrite recording system and this makes it possible to achieve downsizing of an external magnetic field generator for recording and low power consumption.

Here, as a material of the recording layer 5, besides DyFeCo mentioned in the present embodiment, TbFeCo, GbTbFe and NdDyFeCo are suitable. Besides the above materials, when at lease one kind of elements in Cr, V, Nb, Mn, Be and Ni is added, long period reliability can be further improved.

In addition, a material, composition and a film thickness of the reading-out layer 3 determine the film thickness of the recording layer 5, but the suitable thickness is approximately 20 nm to 100 nm.

What is claimed is:

1. A magneto-optical recording medium formed in a substrate comprising:

a recording layer deposited on said substrate, said recording layer being a perpendicularly magnetized layer at all temperatures from room temperature to the Curie point of the recording layer;

a reading-out layer which is an in-plane magnetized magnetic layer at room temperature and is a perpendicularly magnetized layer at temperatures above said room temperature, said reading-out layer being configured to have a compensation point at which magnetization becomes zero and being of a selected composition so that a difference in temperature between the compensation point of said reading-out layer and the Curie point of said recording layer is not more than 120° C.; so as to decrease a leakage magnetic field generated from said reading-out layer at a vicinity of the Curie point of said recording layer, thus decreasing a magnetic field intensity necessary to reverse a magnetization of said recording layer at a vicinity of the Curie point of said recording layer contrary to the leakage magnetic field of said reading-out layer; and an intermediate layer which is an in-plane magnetized magnetic layer at all temperatures from room temperature up to the Curie point of the intermediate layer, said intermediate layer being of a composition selected to have a lower Curie point than said recording layer, so as to intercept an exchange-coupling force between said recording layer and said reading-out laver at a vicinity of the Curie point of said recording layer, said intermediate layer being disposed adjacent to and between each of said reading-out layer and said recording layer.

2. The magneto-optical recording medium as defined in claim 1, wherein said reading-out layer is formed of $Gd_X(Fe_{0.82}Co_{0.18})_{1-X}$ wherein X is in a range of $0.19<X<0.29$.

3. The magneto-optical recording medium as defined in claim 1, wherein said reading-out layer is formed of $Gd_X(Fe_{1-Y}Co_Y)_{1-X}$ wherein X is in a range of $0 \leq X \leq 1$ and Y is in a range of $0.1<Y<0.5$.

4. The magneto-optical recording medium as defined in claim 1, wherein said reading-out layer is formed of $Gd_XFe_{1-X}$ wherein X is in a range of $0.24<X<0.35$.

5. The magneto-optical recording medium as defined in claim 1, wherein said reading-out layer is formed of $Gd_XCo_{1-X}$ wherein X is in a range of $0.20<X<0.35$.

6. The magneto-optical recording medium as defined in claim 1, wherein said reading-out layer is formed of $Tb_X(Fe_{1-Y}Co_y)_{1-X}$ wherein X is in a range of $0.20<X<0.30$ and Y is in a range of $0 \leq Y \leq 1$.

7. The magneto-optical recording medium as defined in claim 1, wherein said reading-out layer is formed of $Dy_X(Fe_{1-Y}Co_y)_{1-X}$ wherein X is in a range of $0.24<X<0.33$ and Y is in a range of $0 \leq Y \leq 1$.

8. The magneto-optical recording medium as defined in claim 1, wherein said reading-out layer is formed of $Ho_X(Fe_{1-Y}Co_Y)_{1-X}$ wherein X is in a range of $0.25<X<0.45$ and Y is in a range of $0 \leq Y \leq 1$.

9. The magneto-optical recording medium as defined in claim 1, wherein film thickness of said reading-out layer is 20 nm to 100 nm.

10. The magneto-optical recording medium as defined in claim 9, wherein film thickness of said reading-out layer is 50 nm to 100 nm.

11. The magneto-optical recording medium as defined in claim 1, wherein Curie point of said recording layer is 150° C. to 250° C.

12. The magneto-optical recording medium as defined in claim 1, wherein said intermediate layer is formed of $Gd_X(Fe_YCo_{1-Y})_{1-X}$ wherein X is in a range of $0.05 \leq X \leq 0.17$ and Y is in a range of $0 \leq Y \leq 1$ or wherein X is in a range of $0.30 \leq X \leq 0.95$ and Y is in a range of $0 \leq Y \leq 1$.

13. The magneto-optical recording medium as defined in claim 1, wherein said intermediate layer is formed of $(Gd_YDy_{1-Y})_XFe_{1-X}$ wherein X is in a range of $0.05 \leq X \leq 0.15$ and Y is in a range of $0.3 \leq Y \leq 1.0$ or wherein X is in a range of $0.35 \leq X \leq 0.95$ and Y is in a range of $0.3 \leq Y \leq 1.0$.

14. The magneto-optical recording medium as defined in claim 13, wherein Y is in a range of $0.3 \leq Y \leq 0.85$.

15. The magneto-optical recording medium as defined in claim 1, wherein film thickness of said intermediate layer is 2 nm to 50 nm.

16. The magneto-optical recording medium as defined in claim 1, wherein film thickness of said recording layer is 20 nm to 100 nm.

17. The magneto optical recording medium of claim 1 wherein the composition of the intermediate layer is selected so that the Curie point of the intermediate layer is not less than 130° C.

18. The magneto-optical recording medium of claim 1, wherein the difference in temperature is less than 120° C.

19. The magneto-optical recording medium of claim 1, wherein the difference in temperature is not more than 60° C. and a magnetic field intensity necessary to saturate CNR is not more than 10 kA/m.

* * * * *